United States Patent
Hamayoshi et al.

(10) Patent No.: US 8,210,999 B2
(45) Date of Patent: Jul. 3, 2012

(54) ROLL FOR USE IN GALVANIZING POT

(75) Inventors: Shigeyuki Hamayoshi, Fukuoka-ken (JP); Shingo Nogami, Fukuoka-ken (JP); Shigetada Sugiyama, Fukuoka-ken (JP)

(73) Assignee: Hitachi Metals Ltd., Tokyo (JP)

( * ) Notice: Subject to any disclaimer, the term of this patent is extended or adjusted under 35 U.S.C. 154(b) by 1497 days.

(21) Appl. No.: 10/596,362

(22) PCT Filed: Dec. 13, 2004

(86) PCT No.: PCT/JP2004/018587
§ 371 (c)(1),
(2), (4) Date: Jun. 9, 2006

(87) PCT Pub. No.: WO2005/056862
PCT Pub. Date: Jun. 23, 2005

(65) Prior Publication Data
US 2007/0074657 A1    Apr. 5, 2007

(30) Foreign Application Priority Data
Dec. 11, 2003   (JP) .................... 2003-413529

(51) Int. Cl.
*B21B 27/02*   (2006.01)
*F16C 13/00*   (2006.01)
(52) U.S. Cl. .......... 492/3; 492/47; 492/59; 29/895.212
(58) Field of Classification Search ............... 492/3, 47, 492/53, 59; 29/447, 895.212
See application file for complete search history.

(56) References Cited

U.S. PATENT DOCUMENTS

| | | | | |
|---|---|---|---|---|
| 5,649,891 A | * | 7/1997 | Kass et al. | ............ 492/47 |
| 6,065,876 A | | 5/2000 | Suhara et al. | |
| 6,589,048 B2 | * | 7/2003 | Kass et al. | ............ 432/60 |
| 2002/0164475 A1 | | 11/2002 | Imamura et al. | |

FOREIGN PATENT DOCUMENTS

| | | | |
|---|---|---|---|
| EP | 0 864 665 | | 9/1998 |
| JP | 04017928 A | * | 1/1992 |
| JP | 05-195178 A | | 8/1993 |
| JP | 5-195178 A | | 8/1993 |
| JP | 05-306441 | | 11/1993 |
| JP | 11-349381 A | | 12/1999 |
| JP | 2001-089836 A | | 4/2001 |
| JP | 2001-089837 A | | 4/2001 |
| JP | 2001-33 5368 A | | 12/2001 |
| JP | 2001-335368 A | | 12/2001 |
| JP | 2002-161346 A | | 6/2002 |
| JP | 2002-161347 | | 6/2002 |
| JP | 2002286397 A | * | 10/2002 |
| JP | 2003-306752 A | | 10/2003 |

OTHER PUBLICATIONS

European Search Report dated Oct. 21, 2009.

* cited by examiner

*Primary Examiner* — Sarang Afzali
(74) *Attorney, Agent, or Firm* — Sughrue Mion, PLLC

(57) ABSTRACT

A roll for use in a galvanizing pot, comprising a hollow body brought into contact with a steel strip, and shaft portions connected to the body, at least the body being made of a silicon nitride ceramic having thermal conductivity of 50 W/(m·K) or more at room temperature, and the body having an average surface roughness Ra of 1-20 μm. The body is preferably shrink-fit to the shaft portions.

11 Claims, 5 Drawing Sheets

ROLL FOR USE IN GALVANIZING POT

FIELD OF THE INVENTION

The present invention relates to a roll such as a sink roll, a support roll, etc., which is immersed in a pot for forming a metal plating such as a zinc plating, etc. on a steel strip.

BACKGROUND OF THE INVENTION

A continuous galvanizing apparatus has such a structure as typically shown in FIG. 7. This continuous galvanizing apparatus comprises a pot 4 containing a molten zinc 3, a snout 2 immersed in a surface-layer portion of the molten zinc 3 to prevent the oxidation of a steel strip 1 introduced into the molten zinc 3, a sink roll 5 disposed in the molten zinc 3, a pair of support rolls 6, 6 positioned above the sink roll 5 in the molten zinc 3, and a gas-wiping nozzle 7 positioned slightly above the surface of the molten zinc 3. Without being applied an external driving force, the sink roll 5 is driven by contact with the running steel strip 1. One of the support rolls 6, 6 is a driving roll connected to an external motor (not shown), and the other is a driven roll. Non-driving-type support rolls, to which no external driving force is applied, may be used. The sink roll 5 and a pair of support rolls 6, 6 are fixed to a frame (not shown), and always immersed in the molten zinc 3 as an integral means.

The steel strip 1 enters into the molten zinc 3 through the snout 2, and its moving direction is changed by the sink roll 5. The steel strip 1 moving upward in the molten zinc 3 is sandwiched by a pair of support rolls 6, 6, to keep its pass line and prevent its warping and vibration. The gas-wiping nozzle 7 blows a high-speed gas onto the steel strip 1 exiting from the molten zinc 3. The thickness of the molten zinc attached to the steel strip 1 can be uniformly controlled by the gas pressure and blowing angle of a high-speed gas. Thus, a galvanized steel strip 1' can be obtained.

Because the sink roll and the support roll used in the galvanizing pot are exposed to an extremely corrosive environment due to the molten metal, they have conventionally been made of iron materials having excellent corrosion resistance such as stainless steel, chromium-based, heat-resistant steel, etc. However, these rolls' surfaces are disadvantageously corroded and worn by immersion in the molten metal pot for a long period of time. Thus proposed as rolls for use in galvanizing pots are those having bodies made of ceramics having excellent corrosion resistance, heat resistance and wear resistance, which are brought into contact with steel strips.

JP5-195178A discloses a support roll rotating in a galvanizing pot in contact with a steel strip, which comprises a hollow steel roll, and an oxide- or carbide-based ceramic coating thermally sprayed on the hollow steel roll, the ceramic coating being dulled to have a surface roughness Ra of 1.0-30 μm. With the thermally sprayed ceramic coating having a surface roughness Ra of 1.0-30 μm, friction increases between the roll and a steel strip, thereby preventing the roll from insufficiently rotating and the steel strip from being damaged due to the insufficient roll rotation. However, because a ceramic is thermally sprayed on an iron roll matrix, cracking occurs in the ceramic coating due to the difference in a thermal expansion coefficient between the matrix and the ceramic coating. As a result, the roll is disadvantageously corroded from cracks to be drastically worn.

The drastically worn roll cannot keep circularity, thereby causing vibration in the roll and the steel strip. It is thus impossible to obtain a steel strip with a uniform-thickness plating. Accordingly, a plating operation should conventionally be stopped after continuous use for one week or two to exchange a worn roll to new one. This drastically lowers the galvanizing efficiency and increases the plating cost.

JP2001-89836A discloses a roll for use in a galvanizing pot, which comprises a hollow roll body and shaft portions both made of a silicon nitride ceramic, the shaft portions being fit or screwed to both end portions of the roll body. Because this roll is entirely made of a ceramic, it has excellent corrosion resistance, heat resistance and wear resistance.

JP2001-89837A discloses a roll for continuous galvanization comprising a hollow roll body and shaft portions both made of a silicon nitride ceramic, the shaft portions being connected to both end portions of the roll body by fitting or screwing, and the shaft portions being provided with apertures on their peripheral surfaces for discharging a molten metal therethrough.

JP2003-306752A discloses a roll for continuous galvanization comprising a hollow roll body, shaft portions and a driving clutch portion each made of a ceramic, the shaft portions being fit to both end portions of the roll body such that there is a gap between the inner surface of the roll body and the outer surface of the shaft portion, the driving clutch portion being fit to a driving-side shaft portion such that there is a gap between the outer surface of the driving-side shaft portion and the inner surface of the driving clutch portion, and each fitting portion being fixed by bolts, pins, etc.

However, the silicon nitride ceramics used in JP2001-89836A, JP2001-89837A and JP2003-306752A are, for instance, sialon comprising 87% by weight of $\alpha$-$Si_3N_4$, 5% by weight of $Al_2O_3$, 3% by weight of AlN, and 5% by weight of $Y_2O_3$, having thermal conductivity of at most about 17 W/(m·K), and insufficient heat shock resistance. Accordingly, when it is immersed in a molten metal pot, it is likely to be broken by heat shock.

OBJECT OF THE INVENTION

Accordingly, an object of the present invention is to provide a silicon nitride ceramic roll for use in a galvanizing pot, which has such high heat shock resistance that it is free from breakage due to heat shock during the use, and can surely follow the speed change of a running steel strip with reduced sliding to the steel strip.

DISCLOSURE OF THE INVENTION

Thus, the roll of the present invention for use in a galvanizing pot comprises a hollow body brought into contact with a steel strip, and shaft portions connected to the body, at least the body being made of a silicon nitride ceramic having thermal conductivity of 50 W/(m·K) or more at room temperature, and the body having an average surface roughness Ra of 1-20 μm.

It is preferable that the silicon nitride ceramic is a sintered body based on silicon nitride, and that the silicon nitride ceramic comprises 0.2% or less by weight of aluminum and 5% or less by weight of oxygen. The silicon nitride ceramic preferably has a relative density of 98% or more, and a 4-point bending strength of 700 MPa or more at room temperature.

The silicon nitride ceramic preferably has a coefficient R of 600 or more, the coefficient R being expressed by the formula of $R=\sigma c(1-\nu)/E\alpha$, wherein $\sigma c$ represents a 4-point bending strength (MPa) at room temperature, $\nu$ represents a Poisson's ratio at room temperature, E represents a Young's modulus (GPa) at room temperature, and $\alpha$ represents an average thermal expansion coefficient from room temperature to 800° C.

It is preferable that the inner surface of the body comprises large-diameter regions on both sides and a small-diameter region in the center, and that each of the shaft portions has a small-diameter portion, a flange and a large-diameter portion, the large-diameter region of the body being connected to the large-diameter portion of the shaft portion.

Each of the shaft portions is preferably provided with pluralities of longitudinal grooves extending through the large-diameter portion and the flange, the grooves forming apertures communicating with the inside of the roll in a state where the shaft portions are connected to both end portions of the body.

In the roll of the present invention for use in a galvanizing pot, each large-diameter region of the inner surface of the body is preferably shrink-fit to the large-diameter portion of each shaft portion. The shrink-fitting ratio of each large-diameter region of the body to the large-diameter portion of each shaft portion is preferably in a range of 0.01/1000 to 0.5/1000.

The ratio of the inner diameter Sb of each small-diameter region of the body to the inner diameter Sa of each large-diameter region of the body is preferably 0.9 or more and less than 1.0.

The large-diameter region of the body is preferably axially longer than the large-diameter portion of the shaft portion, so that there is a gap between the end of each small-diameter region of the body and the inner end of the shaft portion. This gap acts as a space for keeping each small-diameter region of the body from coming into contact with the tip end of the large-diameter portion of the shaft portion.

The ratio of the effective length (shrink-fitting length) $L_S$ of the large-diameter portion of the shaft portion to the outer diameter (shrink-fitting diameter) $D_L$ of the large-diameter portion of each shaft portion is preferably 0.5-2.0. The ratio of the outer diameter $S_{out}$ of the body to the outer diameter $D_S$ of the small-diameter portion of each shaft portion is preferably 2-10.

Because the roll of the present invention for use in a galvanizing pot is made of silicon nitride ceramic having high thermal conductivity, quick heat conduction occurs between the surface and inside of the roll in an actual continuous galvanizing line, so that the roll is resistant to cracking and breakage due to thermal stress. Namely, the roll of the present invention has excellent heat shock resistance. At least the roll body most required to have heat shock resistance because of contact with a steel strip should be made of silicon nitride ceramic having high thermal conductivity. To have completely the same thermal expansion coefficient, both body and shaft portions are preferably made of silicon nitride ceramic having high thermal conductivity, but the shaft portions may be made of other ceramics than high-thermal-conductivity silicon nitride ceramics, depending on use conditions, etc. On the other hand, conventional silicon nitride ceramics as described in JP2001-89836A, JP2001-89837A and JP2003-306752A have thermal conductivity of at most about 17 W/(m·K) at room temperature, insufficient in heat shock resistance when used in a continuous galvanizing line. The silicon nitride ceramic used in the present invention have thermal conductivity of 50 W/(m·K) or more at room temperature, because of reduced amounts of aluminum and oxygen as impurities.

Because the roll of the present invention for use in a galvanizing pot comprises a body whose large-diameter regions are shrink-fit to the large-diameter portions of shaft portions, the shaft portions are not detached from the body even when the roll is immersed in the galvanizing pot for a long period of time, so that it can conduct continuous galvanizing for a long period of time. In addition, no complicated screwing of the shaft portions to the body is needed, resulting in easy assembling and reduced production cost.

Further, because the roll has pluralities of apertures between the body and each shaft portion, which communicate with the inside of the roll, a molten metal quickly enters inside the roll when the roll is immersed in the galvanizing pot, thereby reducing the temperature difference between the outside and inside of the roll and thus suppressing heat shock. And when the roll is taken out of the galvanizing pot, the molten metal can be quickly discharged from the roll to prevent a large amount of a molten metal from solidifying in the roll. Because the small-diameter region of the body has a sufficiently smaller inner diameter than the inner diameter of the large-diameter region, a molten metal inside the roll can smoothly flow toward pluralities of apertures, so that the molten metal can be quickly discharged through pluralities of apertures.

DESCRIPTION OF THE PREFERRED EMBODIMENTS

[1] Silicon Nitride Ceramic

Figure 1A:
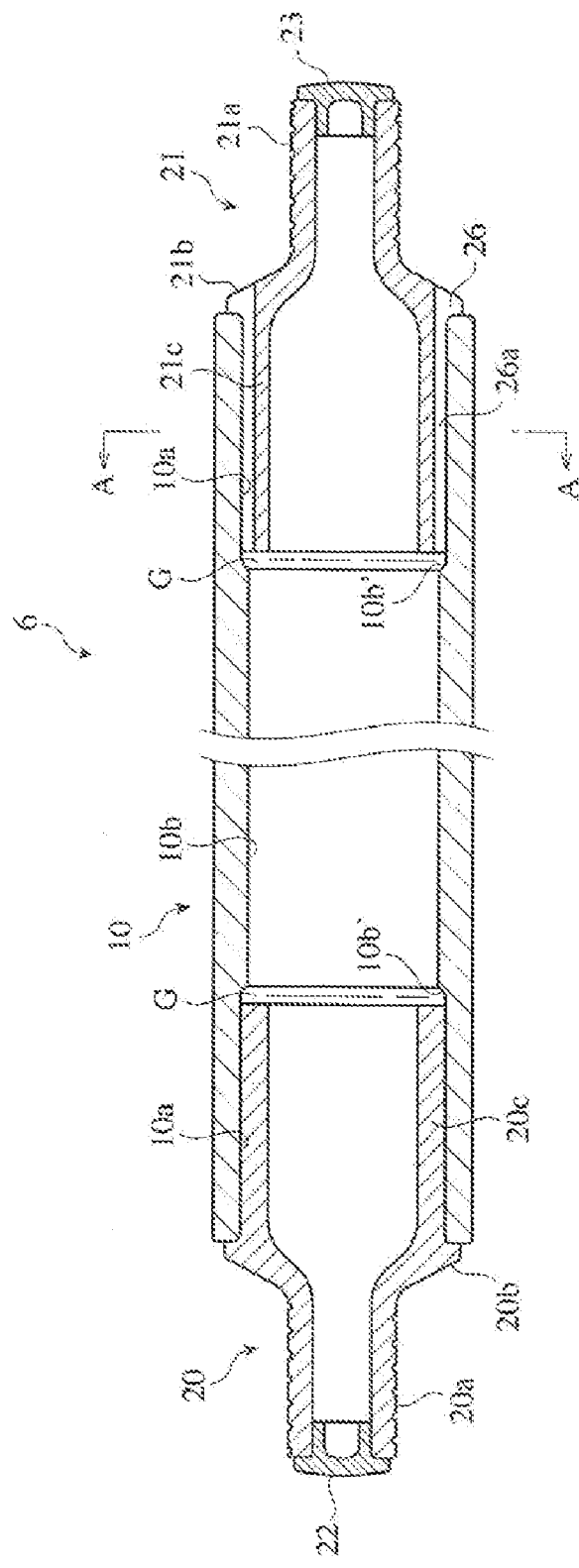
FIG. 1(a) is a cross-sectional view showing a roll for use in a galvanizing pot according to one embodiment of the present invention.

At least a body of the roll of the present invention is made of a silicon nitride ceramic having high thermal conductivity. The silicon nitride ceramic itself may be the same as described in JP2001-335368A.

Aluminum and oxygen in the silicon nitride ceramic act as a phonon-scattering source, reducing the thermal conductivity. The silicon nitride ceramic is constituted by silicon nitride particles and a grain boundary phase surrounding them, aluminum and oxygen are contained in these phases. Because aluminum has an ion radius close to that of silicon, aluminum is easily dissolved in the silicon nitride particles. The dissolution of aluminum lowers the thermal conductivity of silicon nitride particles per se, resulting in drastic decrease in the thermal conductivity of the silicon nitride ceramic. Accordingly, the aluminum content in the silicon nitride ceramic should be as small as possible.

Most of oxygen in oxides added as sintering aids exists in the grain boundary phases. To provide the silicon nitride ceramic with high thermal conductivity, it is necessary to reduce the amount of the grain boundary phase having lower thermal conductivity than that of the silicon nitride particles. The lower limit of the amount of the sintering aid added is determined such that a sintered body having a relative density of 85% or more is obtained. With the sintering aids added in as small amounts as possible in this range, it is necessary to reduce the amount of oxygen in the grain boundary phase.

Because the use of silicon nitride powder containing a small amount of oxygen reduces the oxygen content in the grain boundary phase, thereby reducing the amount of the grain boundary phase per se, the sintered body is provided with high thermal conductivity, but the silicon nitride powder becomes less sinterable due to decrease in the amount of $SiO_2$ formed during the sintering process. However, the use of MgO having higher sinterability than that of the other oxides as a sintering aid can produce a denser sintered body because of the reduced amount of the sintering aid added. As a result, the sintered body is provided with drastically increased thermal conductivity.

Sintering aids which can be added together with magnesium are Group 3a (IIIA) elements in the Periodic Table, such as Y, La, Ce, Nd, Pm, Sm, Eu, Gd, Dy, Ho, Er, Tm, Yb, Lu, etc. Among them, Y, La, Ce, Gd, Dy and Yb are preferable because they do not make the sintering temperature and pressure too high.

The silicon nitride ceramic used in the present invention has thermal conductivity of 50 W/(m·K) or more, preferably 60 W/(m·K) or more, at room temperature. The oxygen content in the silicon nitride ceramic is 5% or less by weight to obtain the thermal conductivity of 50 W/(m·K) or more, and 3% or less by weight to obtain the thermal conductivity of 60 W/(m·K) or more. Also, the oxygen content in the silicon nitride particles is 2.5% or less by weight to obtain the thermal conductivity of 50 W/(m·K) or more, and 1.5% or less by weight to obtain the thermal conductivity of 60 W/(m·K) or more. Further, the aluminum content in the silicon nitride ceramic is 0.2% or less by weight to obtain the thermal conductivity of 50 W/(m·K) or more, and 0.1% or less by weight to obtain the thermal conductivity of 60 W/(m·K) or more.

the total amount of magnesium (converted to MgO) and a Group 3a (IIIA) element of the Periodic Table [converted to oxide ($IIIA_2O_3$)] in the silicon nitride ceramic is preferably 0.6-7% by weight. When the total amount is less than 0.6% by weight, the relative density of the sintered body is insufficiently less than 95%. On the other hand, when it exceeds 7% by weight, the grain boundary phase having low thermal conductivity becomes excessive, resulting in the sintered body with thermal conductivity of less than 50 W/(m·K). MgO+$IIIA_2O_3$ is more preferably 0.6-4% by weight.

The weight ratio of MgO/$IIIA_2O_3$ is preferably 1-70, more preferably 1-10, most preferably 1-5. When MgO/$IIIA_2O_3$ is less than 1, the percentage of the rare earth oxide in the grain boundary phase is too high, leading to poor sinterability and thus failing to obtain a dense sintered body. When MgO/$IIIA_2O_3$ exceeds 70, the diffusion of Mg cannot be suppressed during sintering, resulting in the sintered body with an uneven surface color. When MgO/$IIIA_2O_3$ is within a range of 1-70, remarkably high thermal conductivity can be achieved by sintering at 1650-1850° C. When the sintered body is heat-treated at 1800-2000° C., the thermal conductivity is further increased. Increase in the thermal conductivity by a heat treatment is due to the growth of silicon nitride particles and the evaporation of MgO having high vapor pressure.

The total amount of aluminum, magnesium and the Group 3a (IIIA) element of the Periodic Table in the silicon nitride particles is preferably 1.0% or less by weight.

When the percentage of β-silicon nitride particles having minor axes of 5 μm or more is more than 10 volume % of those in the sintered silicon nitride, the sintered body is provided with improved thermal conductivity, but it has drastically decreased fracture strength, failing to have bending strength of 700 MPa or more, because coarse particles introduced into its structure act as starting points of breakage. Accordingly, the percentage of β-silicon nitride particles having minor axes of 5 μm or more is preferably 10% or less by volume of those in the sintered silicon nitride. Similarly, to suppress coarse particles introduced into the structure from acting as starting points of breakage, the β-silicon nitride particles preferably have aspect ratios of 15 or less.

The silicon nitride ceramic forming at least the roll body should have sufficient resistance to drastic temperature change. The resistance to drastic temperature change is expressed by a coefficient represented by the following formula (1):

$$R = \sigma c(1-\nu)/E\alpha \tag{1}$$

wherein σc represents a 4-point bending strength (MPa) at room temperature, ν represents a Poisson's ratio at room temperature, E represents a Young's modulus (GPa) at room temperature, and α represents an average thermal expansion coefficient from room temperature to 800° C. The coefficient R is preferably 600 or more, more preferably 700 or more. When the coefficient R is less than 600, the roll is likely to be broken. The coefficient R can be determined from the 4-point bending strength σc (MPa) at room temperature, the Poisson's ratio ν at room temperature, the Young's modulus E(GPa) at room temperature and the average thermal expansion coefficient α from room temperature to 800° C., which are measured on a test piece cut out of the roll. The 4-point bending strength at room temperature may be called fracture strength.

[2] Roll (1) Structure

Figure 1B:
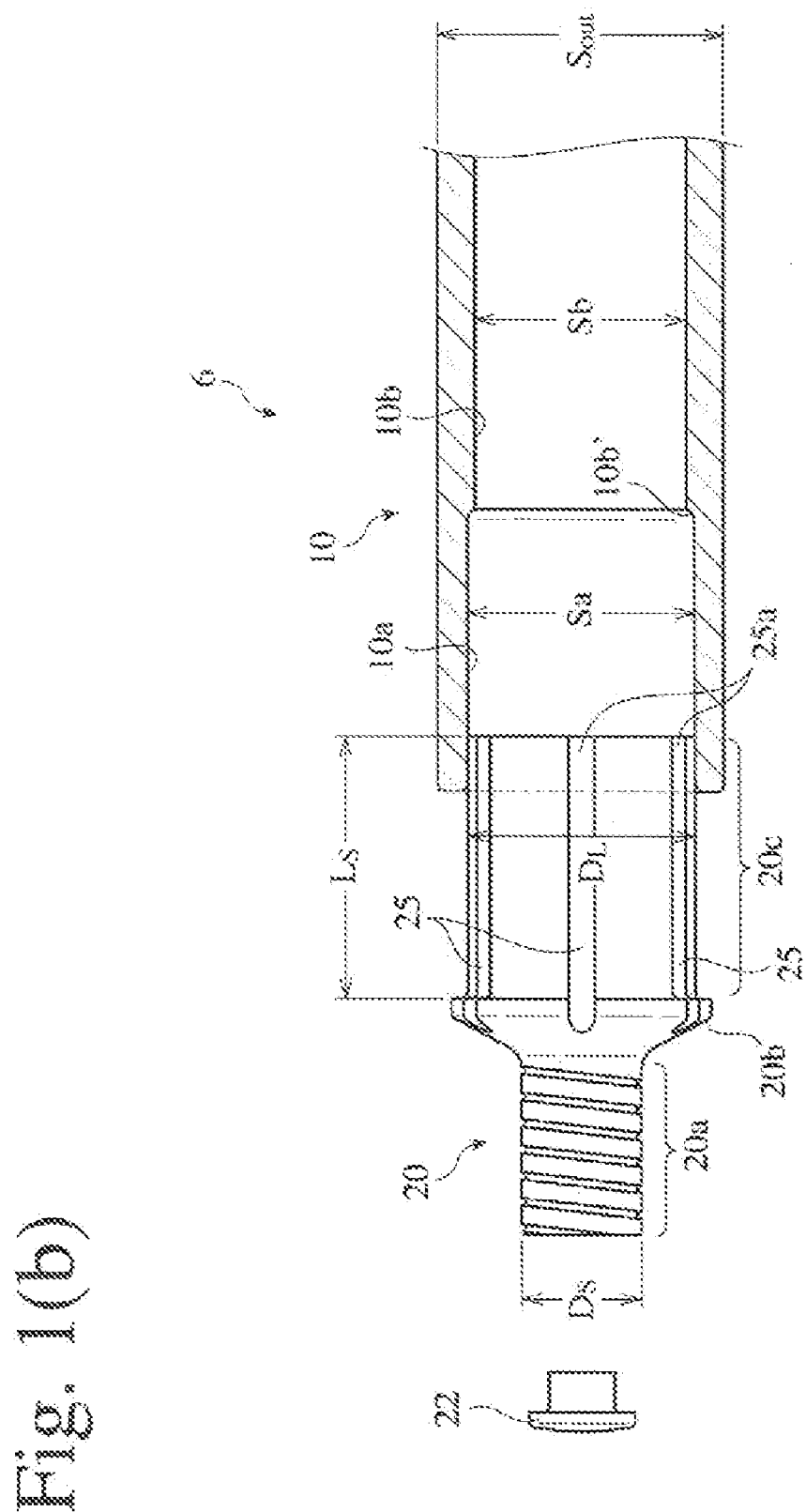
FIG. 1(b) is a partially cross-sectional, exploded view showing a left-half part of the roll of FIG. 1(a).
Figure 2:
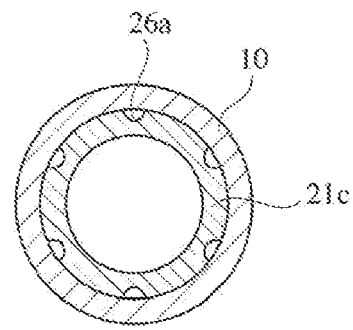
FIG. 2 is an end view taken along the line A-A in FIG. 1(a).
Figure 3:
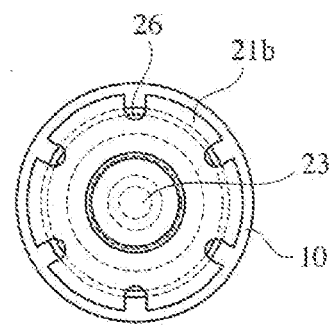
FIG. 3 is a right side view showing the roll of FIG. 1(a).

FIG. 1(a) shows the cross-sectional shape of the roll for use in a galvanizing pot according to one embodiment of the present invention, and FIG. 1(b) shows the roll in a state where one shaft portion is detached from the body. This roll is used as the support roll 6 in the galvanizing pot shown in FIG. 7. The roll 6 comprises a hollow cylindrical body 10, shaft portions 20, 21 each shrink-fit to an end portion of the body 10, and lid-shaped thrust-receiving members 22, 23 each attached to the shaft portion 20, 21. Because the thrust-receiving members 22, 23 are in contact with bearings (not shown) to receive a thrust force during the rotation of the support roll 6, their tip end portions have slowly curved surfaces to weaken the thrust force.

The body 10 is an integral hollow cylinder having on an inner surface large-diameter regions 10a, 10a on both sides and a center small-diameter region 10b, in which the body 10 is thicker than in the large-diameter regions 10a, 10a. Each shaft portion 20 is an integral hollow cylinder having a small-diameter portion 20a, a slowly expanding flange 20b, and a large-diameter portion 20c. A lid-shaped thrust-receiving member 22 is fit to an open end of the small-diameter portion 20a. The shaft portion 21 also has the same structure.

When the support roll 6 is immersed in a molten metal pot, a molten metal should quickly enter into the roll 6 to reduce the temperature difference between the inside and outside of the roll 6. Also, when the support roll 6 is taken out of the molten metal pot, the molten metal should be quickly discharged from the roll 6. For these purposes, there should be gaps between the body 10 and the shaft portions 20, 21. Thus, each shaft portion 20, 21 is provided with longitudinal grooves 25, 26, and each groove 25, 26 forms an aperture 25a, 26a when the shaft portions 20, 21 are connected to the body 10.

Figure 4:
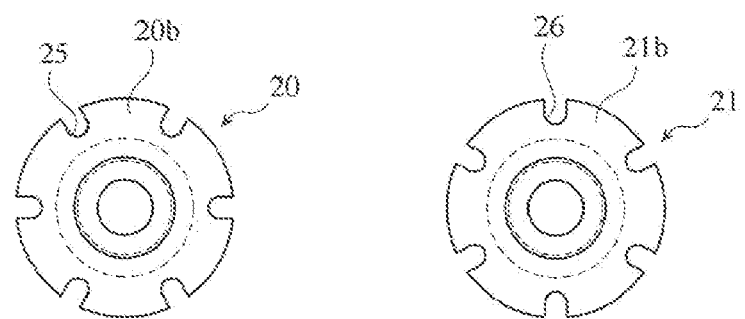
FIG. 4 is a view showing the positional relation of pluralities of grooves formed on right and left shaft portions of the roll of FIG. 1(a).

Because the shaft portions 20, 21 have the same grooves 25, 26, only the grooves 25 on the shaft portion 20 will be explained. As shown in FIGS. 1(a), 1(b) and 4, the shaft portion 20 is provided with 6 longitudinal grooves 25 at a circumferentially equal interval on the peripheral surfaces of the flange 20b and the large-diameter portion 20c. The number of the grooves 25 is not restrictive, but may be 4 or 8, for instance. The cross-sectional shape (width, depth, etc.) of each groove 25 may be determined, taking into consideration the strength of the large-diameter portion 20c at shrink-fitting, the flowability of the molten metal, etc.

FIG. 4 shows the arrangement of the grooves 25, 26 on the right and left flanges 20b, 21b. The grooves 25 are deviated from the grooves 26 by 30° circumferentially. Namely, the grooves 25, 26 are arranged staggeringly when viewed in an axial direction. Accordingly, when the support roll 6 is immersed in the molten zinc pot, the molten metal can quickly enter into any one of the apertures 25a, 26a whichever rotational position the support roll 6 takes. Also, the molten metal can quickly enter into any one of the apertures 25a, 26a during the rotation of the support roll 6. When the support roll 6 is taken out of the molten zinc pot, too, the molten metal can quickly be discharged through any one of the apertures 25a, 26a whichever rotational position the support roll 6 takes.

Figure 5:
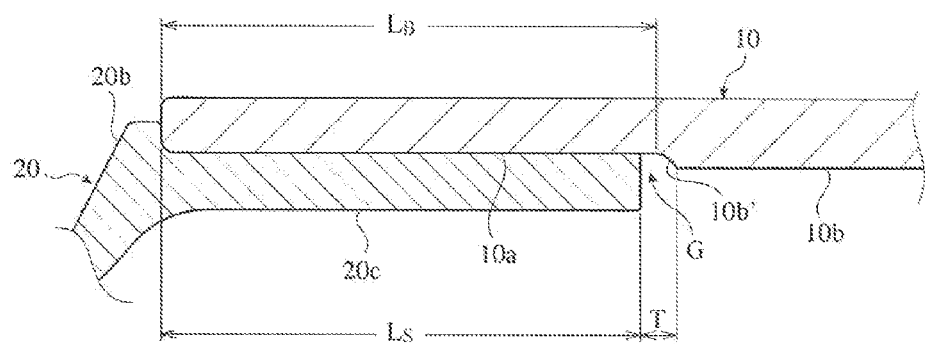
FIG. 5 is a partially enlarged cross-sectional view showing a shrink-fit portion in the roll of FIG. 1(a).

FIG. 5 shows the shrink-fit portion of the body 10 to the shaft portion 20 in an enlarged manner. The large-diameter region 10a (length: $L_B$) of the body 10 is longer than the large-diameter portion 20c, 21c (length: $L_S$) of each shaft portion 20, 21, lest that breakage occurs by the contact of the inner ends of the large-diameter portions 20c, 21c of the shaft portions 20, 21 to the ends of the small-diameter region 10b of the body 10. Thus, there is a gap G between the inner end of the small-diameter region 10b of the body 10 and the inner end of each shaft portion 20, 21. The gap G prevents the inner end of the large-diameter portion 20c, 21c from coming into contact with the inner end of the small-diameter region 10b even with a working tolerance. To smoothly connect the small-diameter region 10b to the large-diameter region 10a, both end portions of the small-diameter region 10b facing the gaps G are provided with slowly curved or tapered surfaces 10b'. The length T of the gap G is preferably 5% or more, more preferably 5-20%, of the shrink-fitting length $L_S$. The body and the shaft portions both made of ceramics preferably have slowly curved or tapered corners in their contact portions to prevent breakage.

The ratio of the inner diameter Sb of the small-diameter region 10b to the inner diameter Sa of the large-diameter region 10a in the body 10 is preferably 0.9 or more and less than 1.0. With Sb/Sa in a range of 0.9 or more and less than 1.0, the molten metal is easily discharged from the roll 6 through the apertures 25a, 26a when the support roll 6 is taken out of the galvanizing pot. The more preferred range of Sb/Sa is 0.9-0.95.

To prevent the breakage of the shrink-fit portions, the ratio of the effective length (shrink-fitting length) $L_S$ to the outer diameter $D_L$ in the large-diameter portion 20c, 21c of each shaft portion 20, 21 is preferably 0.5-2.0. When $L_S/D_L$ is less than 0.5, shrink-fitting provides an insufficient fastening force, so that the shaft portions 20, 21 are easily detached. When $L_S/D_L$ exceeds 2.0, it is difficult to provide high-accuracy cylindricality to each shaft portion 20, 21, resulting in difficulty in a shrink-fitting operation, and a large bending moment is applied to the shrink-fit portions of the shaft portions 20, 21 to the body 10 while the roll is used, making the shrink-fit portions vulnerable to breakage. The more preferred $L_S/D_L$ is 0.8-1.3.

The ratio of the outer diameter $S_{out}$ of the body 10 to the outer diameter $D_S$ of the small-diameter portion 20a, 21a of each shaft portion 20, 21 is preferably 2-10. With $S_{out}/D_S$ in a range of 2-10, the roll can rotate following the steel strip 1 without breakage of the shaft portions 20, 21, even when stress accompanying the conveyance of the steel strip 1 is applied to the shaft portions 20, 21. When $S_{out}/D_S$ is less than 2, there is large wear resistance between the shaft portions 20, 21 and bearings, resulting in difficult rotation. When $S_{out}/D_S$ exceeds 10, excess bending stress is applied to the neck portions of the roll shaft portions 20, 21, so that they are easily broken. In the case of a support roll, $S_{out}/D_S$ is desirably 2-4. In the case of a sink roll, $S_{out}/D_S$ is desirably 6-10.

(2) Shrink-Fitting

In the present invention, the shaft portions 20, 21 are connected to the body 10 preferably by shrink-fitting. The shrink-fitting ratio of the shaft portions 20, 21 to the body 10 is preferably in a range of 0.01/1000 to 0.5/1000. When the shrink-fitting ratio is less than 0.01/1000, the fastening force of the body 10 to the shaft portions 20, 21 is so insufficient that the shaft portions 20, 21 are likely to be loosened or detached from the body 10. When the shrink-fitting ratio exceeds 0.5/1000, an excess fastening force is generated by the shrink-fitting, so that the body 10 or the shaft portions 20, 21 are likely to be broken. The more preferred shrink-fitting ratio is 0.2/1000-0.3/1000.

(3) Surface Roughness

The roll body 10 coming into contact with a steel strip in the galvanizing pot should have an arithmetic average surface roughness Ra of 1-20 μm. To provide the body 10 with uniform surface roughness, a surface of the roll body 10 is preferably subjected to sand blasting or shot peening with steel balls or ceramic particles (silicon carbide particles, alumina particles, etc.) of 10-500 μm in diameter. Because the body 10 having an arithmetic average roughness Ra of 1-20 μm has large friction with a steel strip (no slipping of the steel strip), the roll can surely follow the speed change of a running steel strip. When the average surface roughness Ra is less than 1 μm, the followability of the roll is insufficient. However, when the average surface roughness Ra exceeds 20 μm, the surface roughness of the roll body 10 is undesirably transferred to the plated steel strip. The average surface roughness Ra of the roll body 10 is preferably 2-10 μm, more preferably 3-5 μm.

The present invention will be explained in more detail referring to Examples below without intention of restricting the present invention thereto.

REFERENCE EXAMPLE 1

3.0% by weight of magnesium oxide powder having an average particle size of 0.2 μm, and 3.0% by weight of yttrium oxide powder having an average particle size of 2.0 μm as sintering aids were added to 94.0% by weight of silicon nitride powder having an average particle size of 0.5 μm, and pulverized and mixed in ethanol containing a proper amount of a dispersant. After granulating the resultant powder mixture, it was subjected to cold-isostatic pressing (CIP) in a rubber press. The resultant green body was sintered in a nitrogen gas atmosphere at 1950° C. and 60 atms for 5 hours.

The oxygen content in the resultant sintered silicon nitride was measured by an infrared absorption method. Also, the aluminum content in the sintered silicon nitride was measured by an inductively coupled plasma (ICP) method.

The percentage (volume %) of silicon nitride particles in the sintered silicon nitride was determined by taking a SEM photograph of the sintered silicon nitride after removing grain boundary phase by etching with hydrofluoric acid, and measuring the area ratio (corresponding to volume %) of silicon nitride particles in the SEM photograph. The oxygen content in silicon nitride particles was measured by the infrared absorption method. Further, the percentage of β-silicon nitride particles having minor axes of 5 μm or more in the entire β-silicon nitride particles was measured by an image analysis apparatus.

A test piece of 10 mm in diameter and 3 mm in thickness for measuring thermal conductivity and density, and a test piece of 3 mm in thickness, 4 mm in width and 40 mm in length for a 4-point bending test were cut out of the resultant sintered body. The thermal conductivity was calculated from a specific heat and a thermal diffusion ratio measured at room temperature by a laser flash method according to JIS R1611. The relative density was calculated by dividing a density measured by an Archimedean method according to JIS R2205 by a theoretical density. The 4-point bending strength was measured at room temperature according to JIS R1601.

Further, with respect to a test piece cut out of the sintered body, an average thermal expansion coefficient from room temperature to 800° C., a Poisson's ratio at room temperature, and a Young's modulus were measured. The measurement results are shown in Table 1.

COMPARATIVE REFERENCE EXAMPLE 1

5.0% by weight of alumina powder having an average particle size of 0.5 μm, and 7.0% by weight of yttrium oxide powder having an average particle size of 0.8 μm, as sintering aids, were added to 88.0% by weight of silicon nitride powder having an average particle size of 1.0 μm, and pulverized and mixed in ethanol containing a proper amount of a dispersant. After granulating the resultant powder mixture, it was subjected to cold-isostatic pressing (CIP) in a rubber press. The resultant green body was sintered in a nitrogen gas atmosphere at 1800° C. and 1 atm for 5 hours. The resultant sintered silicon nitride was measured in the same manner as in Reference Example 1. The measurement results are shown in Table 1.

TABLE 1

| No. | Reference Example 1 | Comparative Reference Example 1 |
|---|---|---|
| Oxygen Content In Sintered Body (% by weight) | 0.1 | 5.2 |
| Aluminum Content In Sintered Body (% by weight) | 0.01 | 4.2 |
| Percentage of β-Silicon Nitride Particles Having Minor Axes of 5 μm or More (volume %) | 2 | 17 |
| Oxygen Content In Silicon Nitride Particles (% by weight) | 0.08 | 3.0 |
| Thermal Conductivity At Room Temperature (W/m · K) | 68 | 18 |
| Relative Density (%) | 99.2 | 99.1 |
| 4-Point Bending Strength (MPa) | 928 | 690 |
| Poisson's Ratio | 0.3 | 0.3 |
| Young's Modulus (GPa) | 300 | 300 |
| Average Thermal Expansion Coefficient From Room Temperature To 800° C. ($\times 10^{-6}$/° C.) | 3.0 | 3.0 |
| Coefficient R | 721 | 536 |

EXAMPLE 1

Using the same silicon nitride ceramic as in Reference Example 1, a body 10 and shaft portions 20, 21 of a support roll 6 having the shape shown in FIG. 1(a) were produced by the following procedures. The body 10 was constituted by a hollow cylindrical sintered body having an outer diameter of 250 mm, an inner diameter of 200 mm (corresponding to the inner diameter of a small-diameter region 10b) and a length of 1800 mm, and the inner surface of the body 10 was machined to have large-diameter regions 10a (inner diameter: 210 mm) acting as shrink-fitting portions in regions as deep as 250 mm from each end surface. Each small-diameter region 10b of the body 10 had a curved surface at an end portion 10b'. An outer surface of the body 10 was sand-blasted to an arithmetic average roughness Ra of 4 μm by silicon carbide particles of 200 μm.

Shaft portions 20, 21 were produced in the same manner except for conducting no sand blasting. Each shaft portion 20, 21 had a small-diameter portion 20a, 21a having an outer diameter of 90 mm, an inner diameter of 50 mm and a length of 200 mm, a flange 20b, 21b having an outer diameter of 230 mm and a length of 50 mm, and a large-diameter portion 20c, 21c having an outer diameter of 210 mm, an inner diameter of 160 mm and a length of 250 mm. The outer diameter of the large-diameter portion 20c, 21c of the shaft portion 20, 21 was slightly (by about 40 μm) larger than the inner diameter of the large-diameter region 10a of the body 10. The shaft portion was as long as 500 mm as a whole. Each large-diameter portion 20c, 21c was uniformly provided with 6 semi-cylindrical-cross-sectioned, longitudinal grooves 25 (width: 20 mm, depth: 10 mm) circumferentially arranged on a peripheral surface. Accordingly, the grooves 25 were as deep as 20 mm at the flanges 20b, 21b. Thrust-receiving members 22, 23 were fit into the end portions of the shaft portions 20, 21.

Each large-diameter portion 20c, 21c of the shaft portion 20, 21 was shrink-fit to the large-diameter region 10a in each end portion of the body 10 at a shrink-fitting ratio of 0.2/1000. As shown in FIG. 5, the length T of a gap G between the end of the small-diameter region 10b and the inner end of each shaft portion 20, 21 was 25 mm.

Figure 7:
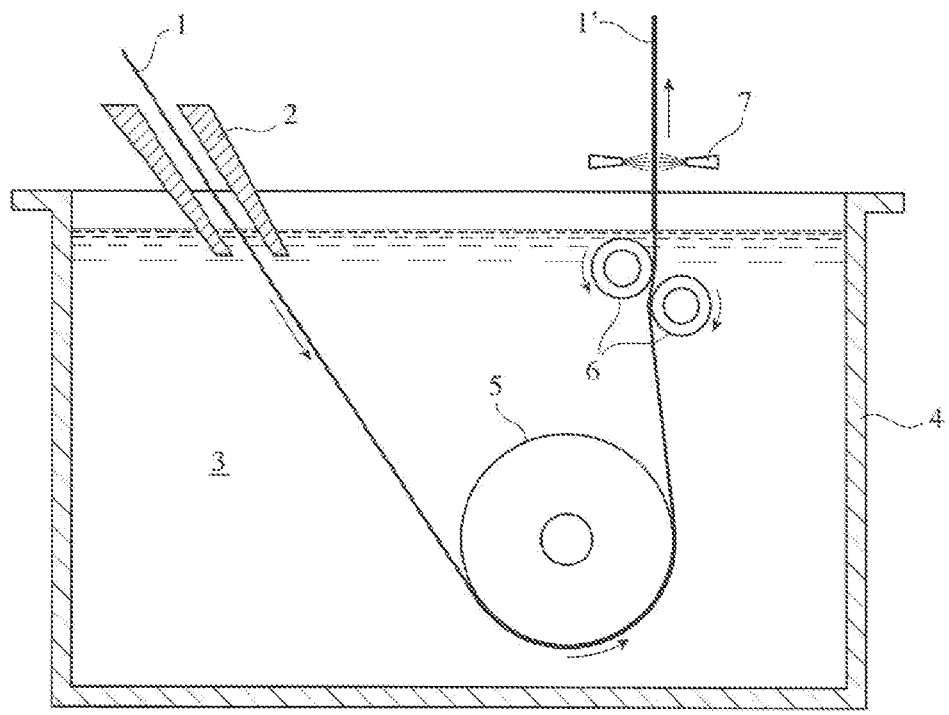
FIG. 7 is a schematic view showing a continuous galvanizing apparatus.

Using this roll as a support roll 6 in the continuous galvanizing apparatus shown in FIG. 7, a strip of stainless steel (SUS300) having a thickness of 2 mm and a width of 1300 mm was plated with zinc. Even after continuous use for about one month, substantially no corrosion and wear were observed on this support roll 6. Also, no cracking was appreciated on the roll at all, confirming that it had excellent heat shock resistance. This appears to be due to the fact that the silicon nitride ceramic forming the roll has as high thermal conductivity as 50 W/(m·K) or more. In addition, the arithmetic average roughness Ra of 4 μm caused the support roll 6 to well follow the speed change of a running steel strip, resulting in a high-quality, zinc-plated steel strip free from defects on a plated surface.

COMPARATIVE EXAMPLE 1

Using the same silicon nitride ceramic as in Comparative Reference Example 1, a body 10 and shaft portions 20, 21 of a support roll 6 having the shape shown in FIG. 1(a) were produced by the same procedure. Using this support roll 6, the same zinc plating as in Example 1 was conducted. As a result, although this support roll 6 exhibited good corrosion resistance and wear resistance, it suffered cracking on the roll surface immediately after starting the use, because it had a coefficient R of less than 600 and thermal conductivity of less than 50 W/(m·K).

EXAMPLE 2

Figure 6:
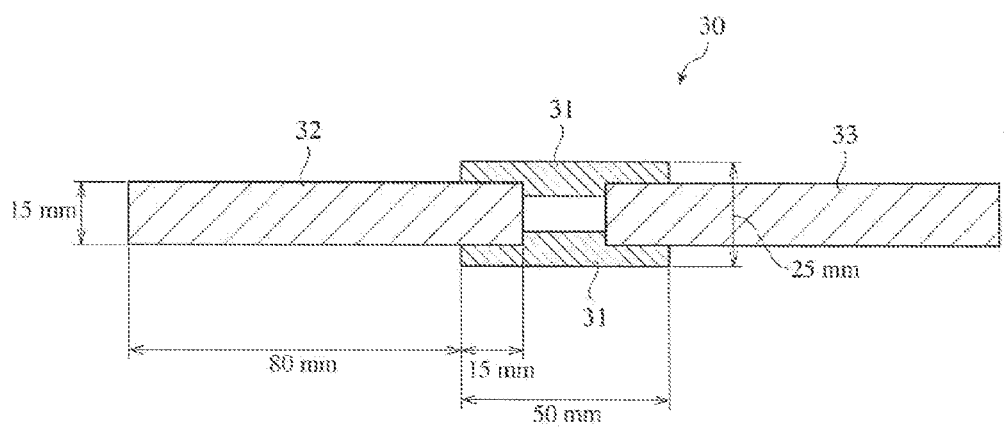
FIG. 6 is a cross-sectional view showing a sleeve assembly for a rotation-bending fatigue test.

To investigate whether or not the shrink-fitting of the shaft portions 20, 21 to the body 10 was broken or loosened by the rotational bending of the roll 6, a rotational bending fatigue test was conducted according to JIS Z 2273. Used in the rotational bending fatigue test was a sleeve assembly 30 comprising a sleeve 31 of 50 mm in length and 25 mm in outer diameter resembling the roll body 10, and cylinders 32, 33 of 95 mm in length and 15 mm in outer diameter resembling the roll shaft portions 20, 21, which were shrink-fit at a shrink-fitting ratio of 0.2/1000, as shown in FIG. 6, and the sleeve assembly 30 was rotated under a bending stress to apply a compression stress and a tensile stress alternately.

The load-applying conditions were adjusted such that all loads were applied to the shrink-fit portions of the sleeve 31 and the cylinders 32, 33. To simulate the load conditions of an actual roll, pressure applied to the shrink-fitting portions was set at 2 kgf/mm². Under this condition, the sleeve assembly 30 was rotated at 3400 rpm in the air at room temperature, to evaluate the breakage of the sleeve 31 and the cylinders 32, 33, and the detaching of the cylinders 32, 33 from the sleeve 31.

As a result, it has been found that the condition for preventing the breakage of shrink-fit portions between the roll body and the roll shaft portions, and the detachment of the roll shaft portions from the roll body is preferably that a shrink-fitting length/shrink-fitting diameter ratio (ratio of the effective length $L_S$ of the large-diameter portion of the roll shaft portion to the outer diameter $D_L$ of the large-diameter portion of the roll shaft portion) is 0.5-2.0.

EXAMPLE 3

Because a roll for use in a galvanizing pot should be rotated in contact with a steel strip at the same speed as the steel strip, it can desirably rotate such that it follows the speed change of a running steel strip. Thus, attention was paid to an inertia moment $GD^2$, in which G represents a weight, and $D^2$ represents the square of a rotation diameter, a physical quantity acting to hinder the change of a rotational movement. As a result, it was found that when a ratio of $S_{out}/D_S$, wherein $S_{out}$ represents the outer diameter of the body 10 shown in FIG. 1(a), and $D_S$ represents the outer diameter of the small-diameter portion 20a, 21a of each shaft portion 20, 21, was in a range of 2-10, GD was so small that the roll rotated easily.

Although the support roll has been described above, the present invention is of course applicable to various rolls for use in galvanizing pots, such as sink rolls, etc.

INDUSTRIAL AVAILABILITY

Because the roll of the present invention for use in a galvanizing pot is made of silicon nitride ceramic having high thermal conductivity, there is only small thermal stress when charged into or taken out of the galvanizing pot, so that it exhibits excellent heat shock resistance. Also, because the roll body has an average surface roughness Ra of 1-20 μm, it can well follow the speed change of a running steel strip, thereby sufficiently preventing defects from occurring on a plating surface. Further, because the shaft portions are shrink-fit to the body, the shaft portions are not detached from the body even after immersion in the galvanizing pot for a long period of time. The roll of the present invention having such features for use in a galvanizing pot can stably produce high-quality, plated steel strips.

What is claimed is:

1. A roll for use in a galvanizing pot, comprising a hollow body, and shaft portions connected to said body, said body being made of a silicon nitride ceramic having thermal conductivity of 50 W/(m·K) or more at room temperature, said body having an average surface roughness Ra of 1-20 μm, and said shaft portions being made of ceramics, wherein an inner surface of said body comprises large-diameter regions on both ends and a small-diameter region in between the large diameter regions, and each of said shaft portions is an integral hollow cylinder having a small-diameter portion, a large-diameter portion and a flange connecting said small-diameter portion and said large-diameter portion, said small-diameter portion and said large-diameter portion of each of said shaft portions have approximately the same thickness, and the large-diameter region of said body is connected to and in direct contact with the large-diameter portion of said shaft portion, wherein said flange expands in outer and inner diameter from said small-diameter portion to said large-diameter portion, and wherein said flange is in direct contact with an axial end surface of said hollow body.

2. The roll for use in a galvanizing pot according to claim 1, wherein each large-diameter region of said body is shrink-fit to the large-diameter portion of each shaft portion.

3. The roll for use in a galvanizing pot according to claim 2, wherein the shrink-fitting ratio of each large-diameter region of said body to the large-diameter portion of each shaft portion is in a range of 0.01/1000 to 0.5/1000.

4. The roll for use in a galvanizing pot according to claim 2, wherein a ratio of an inner diameter Sb of each small-diameter region of said body to an inner diameter Sa of each large-diameter region of the body is 0.9 or more and less than 1.0.

5. The roll for use in a galvanizing pot according to claim 2, wherein the large-diameter region of said body is longer than the large-diameter portion of said shaft portion, so that there is a gap between an end of each small-diameter region of said body and an inner end of said shaft portion.

6. The roll for use in a galvanizing pot according to claim 2, wherein a ratio of an effective length $L_S$ to an outer diameter $D_L$ of the large-diameter portion of each shaft portion is 0.5-2.0.

7. The roll for use in a galvanizing pot according to claim 2, wherein a ratio of an outer diameter $S_{out}$ of said body to an outer diameter $D_S$ of the small-diameter portion of each shaft portion is 2-10.

8. The roll for use in a galvanizing pot according to claim 1, wherein said silicon nitride ceramic comprises 0.2% or less by weight of aluminum and 5% or less by weight of oxygen.

9. The roll for use in a galvanizing pot according to claim 1, wherein said silicon nitride ceramic has a relative density of 98% or more, and a 4-point bending strength of 700 MPa or more at room temperature.

10. The roll for use in a galvanizing pot according to claim 1, wherein said silicon nitride ceramic has a coefficient R of 600 or more, said coefficient R being expressed by the formula of R=σc(1−ν)/Eα, wherein σc represents a 4-point bending strength (MPa) at room temperature, ν represents a Poisson's ratio at room temperature, E represents a Young's modulus (GPa) at room temperature, and α represents an average thermal expansion coefficient from room temperature to 800° C.

11. The roll for use in a galvanizing pot according to claim 1, wherein each of said shaft portions is provided with pluralities of longitudinal grooves extending through said large-diameter portion and said flange, said grooves forming apertures communicating with the inside of said roll in a state where said shaft portions are connected to both end portions of said body.

* * * * *